United States Patent [19]
Beach et al.

[11] Patent Number: 5,668,636
[45] Date of Patent: Sep. 16, 1997

[54] EMBEDDED DATA CONTROLLED DIGITAL HIGHLIGHT COLOR COPIER

[75] Inventors: Richard J. Beach; John Seely Brown; John R. White, all of Palo Alto, Calif.

[73] Assignee: Xerox Corporation, Stamford, Conn.

[21] Appl. No.: 575,764

[22] Filed: Dec. 20, 1995

[51] Int. Cl.[6] .................... G02B 7/00; G01D 15/00
[52] U.S. Cl. ................ 358/296; 358/518; 235/375
[58] Field of Search ........................ 358/296, 500, 358/501, 518, 520, 523, 504; 235/375, 470, 432

[56] References Cited

U.S. PATENT DOCUMENTS

| | | | |
|---|---|---|---|
| 5,221,833 | 6/1993 | Hecht | 235/494 |
| 5,237,517 | 8/1993 | Harrington et al. | 364/526 |
| 5,486,686 | 1/1996 | Zdybel, Jr. et al. | 235/375 |
| 5,568,248 | 10/1996 | Wagley | 399/156 |
| 5,576,532 | 11/1996 | Hecht | 235/494 |
| 5,583,666 | 12/1996 | Ellson | 358/518 |

*Primary Examiner*—Peter Wong
*Assistant Examiner*—Gregory Toatley, Jr.

[57] ABSTRACT

Digital machine readable full color specifications of full color source images are embedded in the printed hardcopy versions of those images; typically through the use of a self-clocking glyph code to minimize the visual impact of the embedded data. This color specification then can be recovered from a hardcopy version of the original source image, even if the hardcopy is monochromatic. Thus, a digital highlight color copier can use this color specification to index into a plurality of different full-color to highlight-color transformse to select the transform or transorms that are most appropriate for rendering a highlight color copy of the source image.

10 Claims, 4 Drawing Sheets

EMBEDDED DATA CONTROLLED DIGITAL HIGHLIGHT COLOR COPIER

BACKGROUND OF THE INVENTION

Color copiers and printers account for a growing share of the reprographics market now that there are moderately priced and easy to use computerized tools for creating color source documents. Xerographic highlight color printers and copiers have enjoyed substantial commercial success with this increased demand for color printing and copying because they fill a need for higher speed, lower priced, color capable, copying equipment.

Four-color copiers and printers provide much broader color gamuts than two-color machines, but the two colors that are used for conventional highlight color printing can be printed in a single pass by a single station xerographic print engine through the use of Xerox' patented tri-level xerography. Furthermore, recent advances in xerography, such as described in commonly assigned Kovacs et al. U.S. Pat. No. 5,347,303 on "Full Color Xerographic Printing System with Dual Wavelength, Single Optical System ROS and Dual Layer Photoreceptor" (which is hereby incorporated by reference), have created quad-level xerography (sometimes referred to as "xerocolography") that enables the printing of three colors (for example, black plus two highlight colors) in a single pass by a single xerographic station. Accordingly, the throughput (i.e., copies or prints per minute) of these 2 or 3 highlight color machines are comparable to those of monochromatic print engines, including high speed print engines (i.e., 90+ pages per minute), and significantly higher than traditional four color print engines.

Additionally, 2 or 3 color printing or copying can be achieved with a full color four-pass print engine at improved throughput speed by reducing the number of passes respectively. For example, when compared to full color printing on a four pass printer, 2 color printing can be done with twice the throughput of full color. Likewise 3 color printing can be done with 33% more throughput than four-pass full color printing.

A 2 or 3 color print engine is referred to herein as a highlight color printer. As pointed out above, two color printing can be achieved with either tri-level xerography in a single pass or with a four-pass/full-color printer in two (instead of four) passes. Three color printing can be achieved with quad-level xerography in a single pass or with a four-pass/full-color printer in three (instead of four) passes. Tri-level and quad-level technologies offer 2 or 3 color printing, respectively, in a single pass at speeds equivalent to black-only printing (90+ pages per minute). Four-pass/full-color printers can produce 2 or 3 color prints with twice or one-and-a-third times more throughput, respectively, than full color printing. These concepts have been previously applied to highlight color printers to achieve relatively high speed, functionally compatible printing of full color, computer generated images using n-to-m color gamut transformations (where m<n) which are selected based on the image characterizing information that is contained by those computer generated images.

To carry out these color gamut transformations, several full-color to 2 or 3 color mappings have been proposed and others may be developed. For example, a commonly assigned U.S. patent application of Harrington, which was filed Aug. 29, 1990 under Ser. No. 07/574,145 on "Color Printing Having a Highlight Color Image Mapped from a Full Color Image" now U.S. Pat. No. 5,237,517 (D/88330), not only describes what are sometimes referred to as a "pictorial" mapping and "presentation" mapping algorithms for mapping full-color images to two-color (typically black plus highlight color) images, but more generally teaches techniques for creating full color-to-highlight color mappings.

Harrington's "pictorial" mapping maintains the integrity of hues that match the highlight color. Thus, for example, if the highlight color in the 2-color space is blue, blues in the original full-color image are mapped into shades of highlight blue; all other colors of the full-color space are mapped into appropriate shades of gray. This means that the two color output image has essentially the same appearance as the full-color source image would have when viewed through a filter having the same color as the highlight color. Thus, the pictorial mapping effectively preserves certain of the natural colors in the source image.

On the other hand, Harrington's "presentation" mapping maps the different intensity levels of a full-color image into a two-color highlight color space. This mapping preserves the distinctiveness of the differently colored regions in the source image, so it is well suited for use with business graphics that are typically composed of text, line-art and synthetic graphical objects.

As will be appreciated, extensions of both the presentation mapping and the pictorial mapping could be employed for mapping full-color images to three-color (typically black plus two highlight colors) space. Regardless, however, of the specific color mappings that are employed, source image information is lost while doing these mappings, so an intelligent selection of the color mapping is the key to producing functionally compatible highlight color renderings of full color images.

Scanned-in full color image files contain far less image characterizing information than computer generated image files. These scanned-in files digitally define images at the pixel level in anyone of a number of different full-color spaces. Examples include RGB (red, green, blue) space, CMYK (cyan, magenta, yellow, black) space, CIE-LAB space and so on. Moreover, color space transformation algorithms exists that can transform a digitally stored color document from one color space to another. Scanned-in image files do not, however, include the image type characterizers that are needed to intelligently select functionally compatible full color-to-highlight color mappings. Thus, the throughput advantages offered by these full color-to-highlight color mappings have not previously been available for copiers (i.e., machines that replicate hardcopy source images), even though the throughput advantages of utilizing these color mappings, as well as the functional compatibility of such mappings, have been demonstrated by the successful highlight color printing of computer generated full color images. Clearly, therefore, there is a need to close this gap.

A concurrently filed, commonly assigned Beach et al U.S. patent application on "Digital Highlight Color Copier" provides an approach for building this needed functionality into digital highlight color copiers for applications in which copies are made from full color versions of the source images. However, still more is needed to provide satisfactory highlight color copying of full color source images that may have experienced significant color degradation, such as by being subjected to a black and white copying process.

SUMMARY OF THE INVENTION

To that end, digital machine readable full color specifications of full color source images are embedded in the printed hardcopy versions of those images; typically through the use of a self-clocking glyph code to minimize the visual impact of the embedded data. This color specification then can be recovered from a hardcopy version of the original source image, even if the hardcopy is monochromatic. Thus, a digital highlight color copier can use this color specification to index into a plurality of different full-color to highlight-color transformse to select the transform or transorms that are most appropriate for rendering a highlight color copy of the source image.

BRIEF DESCRIPTION OF THE DRAWINGS

Further features and advantages of this invention will be evident when the following detailed description is read in conjunction with the attached drawings, in which.

DETAILED DESCRIPTION

Figure 1:
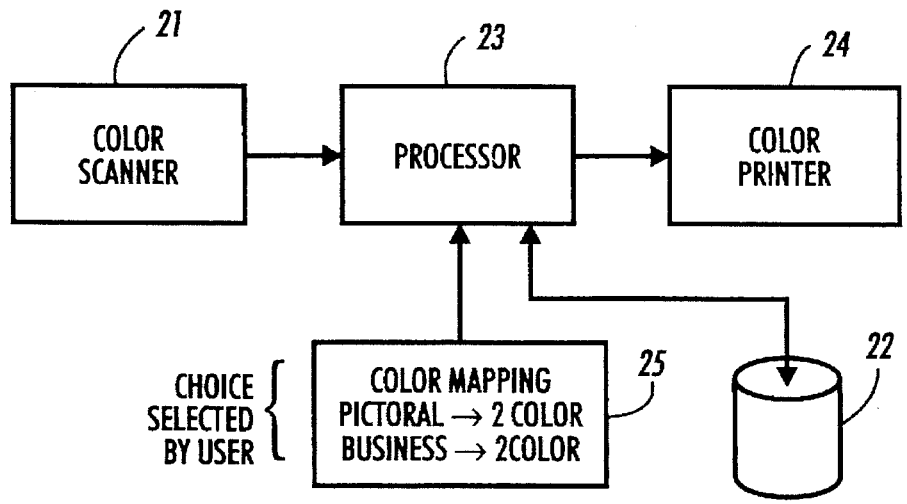
FIG. 1 schematically illustrates a highlight copier system for implementing this invention by analysis of analog information in the full color source images.

As shown in FIG. 1, digital highlight color copiers conventionally have a scanner 21 for scanning-in hardcopy images, a memory 22 for storing digital images, a processor 23 for electronically processing the digitally captured images in accordance with one or more image processing algorithms, and a highlight color print engine 24 for printing the processed images. The processor 23 typically is a general or special purpose computer which is programmed to carry out the image processing and to handle the memory transactions.

In accordance with the present invention, as indicated at 25, the image processing includes an n-to-m color transformation for transforming full color sanned-in digital images to functionally compatible highlight color digital images. If a tri-level or quad-level xerographic print engine is used, this enables highlight color copying (black plus one or two highlight colors) at single-pass, black-only speeds (i.e., 90+ pages per minute). If a four-pass full color printer is used, this enables highlight color copying at twice or 1.333 times the throughput of full color copying.

As previously pointed out, the Harrington pictorial color mapping algorithm or the Harrington presentation color mapping algorithm suitably is employed to carry out a 3-color to 2-color transformation for pictorial images and business graphics, respectively. Conceivably, the selection of the appropriate transform could be made by the user, but this is a suboptimal approach for most production environments and is an incomplete solution for composite images that are composed of a variety of image types (e.g., a mixture of bitmapped or half toned regions, flat color areas, and text or line art). Thus, it would be preferable to extract the information that governs the selection of the color transformation algorithm from the image itself.

Figure 2:
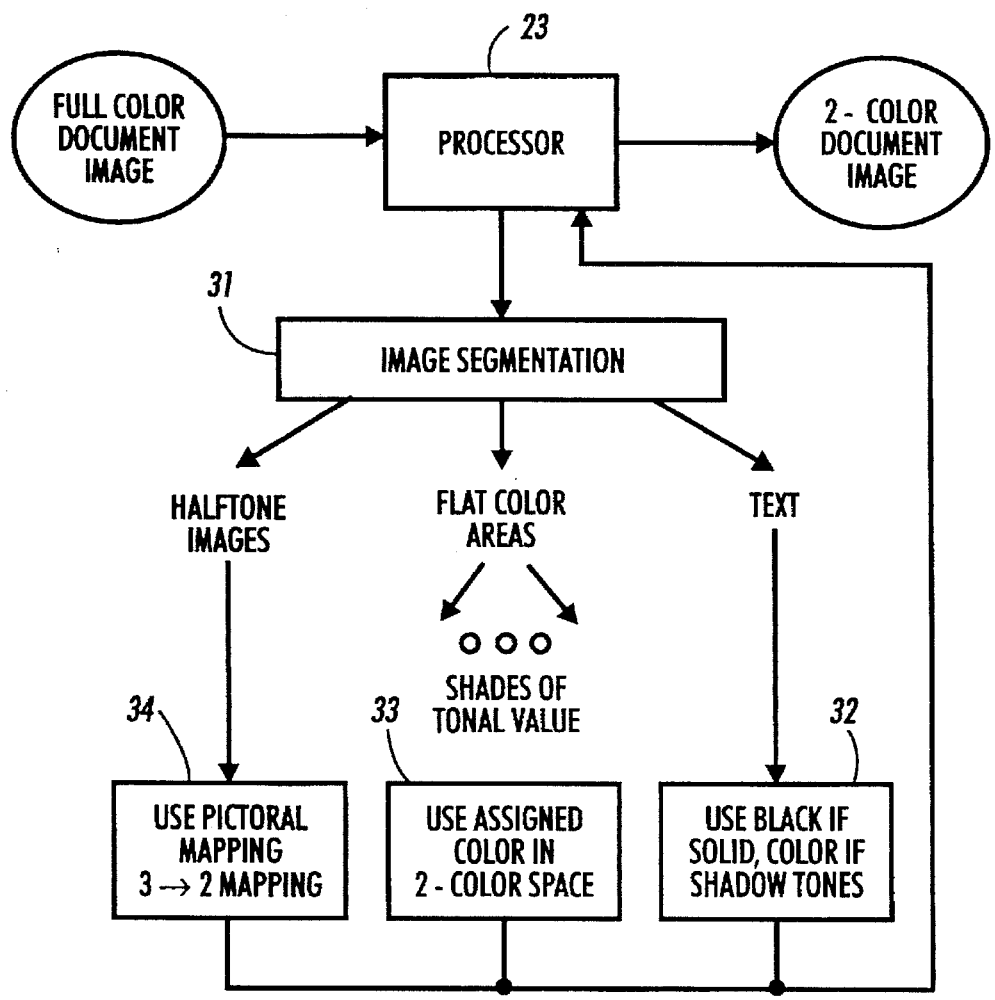
FIG. 2 schematically shows that that the analysis of the full color source images for the embodiment of FIG. 1 can be performed by using new or existing image segmentation techniques.

Turning to FIG. 2, it has been recognized that existing image segmentation techniques can be employed for distinguishing between, for example, continuous or half toned regions, flat color areas, and text or line art regions within digital images. As is known, an image segmenter subdivides (i.e., "segments") the digital image of a page into regions of specific information types (i.e., text, line art, continuous tone) Accordingly, an image segmentation process 31 can be used to generate an indexing signal for selecting, from a plurality of different full color-to-highlight color transforms 32–34, the particular transform that best fits or is most suitable for the determined image segment type. For example, normal text may be mapped to black as at 32, line art may be color mapped with Harrington's presentation mapping algorithm as at 33, and continuous tone regions may be mapped with Harrington's pictorial algorithm as at 35. Clearly, a region-by-region selection of the transform is best for full color compound digital images, but an page-by-page selection may provide sufficient control for highlight color copying of simple full color images. Image segmentation is an example of an image processing technique that is capable of type characterizing an image on a granularity that is sufficiently fine to map different areas of an ordinary image onto different color transforms 32–34 when it is appropriate to do so.

Extensions of this application of image segmentation to the selection of full color-to-highlight color transforms will suggest themselves. Any information type that is distinguishable by the image segmentation process 31 can be assigned a specific full color-to-highlight color mapping algorithm. Thus, for example, bolded text can be mapped to a highlight color to emphasize it. Or distinctive shades of gray in the original can be mapped into highlight color intensities to emphasize the shading.

Figure 3:
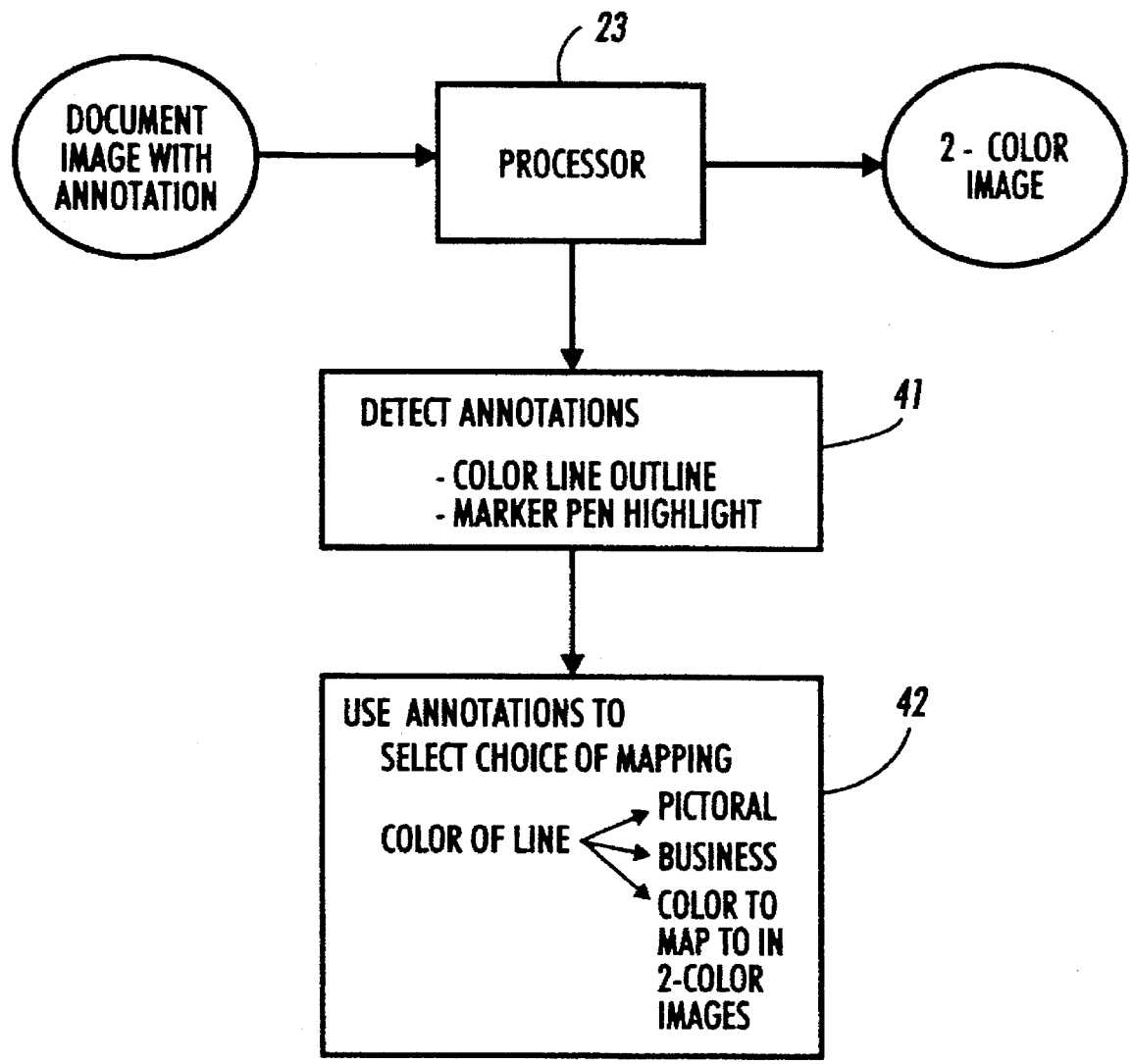
FIG. 3 schematically shows that the analysis of full color source images can be performed by using new or existing image annotation processing techniques.
Figure 4:
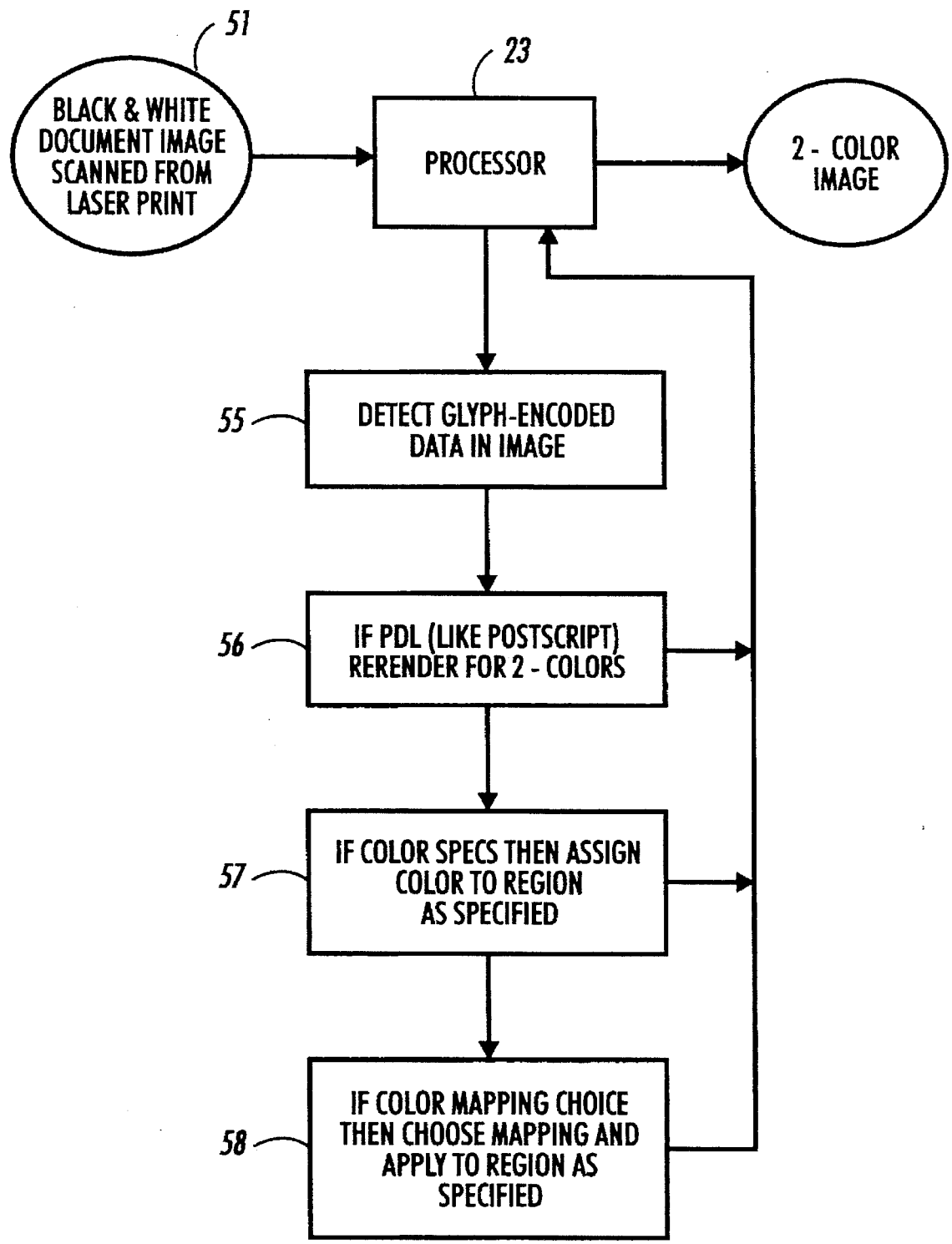
FIG. 4 schematically illustrates an alternative full color-to-highlight copier system which is controlled by machine readable digital color specifications that are embedded in the source images, regardless of whether the copier receives full color, highlight color or monochromatic versions of those source images.

Turning to FIG. 3, annotations in one or more predetermined colors, such as hand drawn outlines, underlining, or marginal delimiting marks, can be applied to identify regions of a document that are to be printed using one or another non-default full color-to-highlight color transform. Known image processing algorithms can be applied, as at 41, to the scanned-in full color digital images to detect these annotations and to extract from them any additional information that is conveyed by their color. Thus, for example, annotations in a first color may result in the selection of a full color-to-highlight color pictorial color mapping, annotations in a second color may result in the selection of a full color-to-highlight color presentation color mapping, and the absence of an annotation may result in a predetermined default color mapping. The annotations themselves are ignored during the color space transformation process 42, so they do not appear on the output copy.

This annotation based control process provides human control over the selection of the color transformations, without requiring user intervention in the highlight color copying process. In other words, this approach can be employed to give the user discretionary control over the selection of some or all of the full color-to-highlight color transforms that are applied while carrying out one or more copying jobs, without reducing the throughput rate at which those jobs are performed. If desired, of course, annotation control can be used in combination with the image segmentation control (FIG. 2) to select full color-to-highlight color mappings. In that event, the annotation control typically would be the dominant control process so that it could be used when desired to override the segmentation control.

A significantly different approach to controlling the selection of the full color-to-highlight color mappings is illustrated in FIG. 3. Like the previously described processes, this process involves transforming scanned-in full color images into highlight color images so that functionally acceptable copies of the scanned-in images can be printed by highlight color print engines. However, the process illustrated in FIG. 3 can be implemented even if the source documents are presented to the scanner 51 (FIG. 1) of the highlight color copier as monochromatic images (e. g., black and white documents) and/or if the scanner 51 is monochromatic. This is so because machine readable functionality is enabled by embedding machine readable, digital, color specifications for the source images in those images and/or on the documents on which the source images are printed. Advantageously, a self-clocking glyph code, such as described in a copending and commonly assigned U.S. patent application of Bloomberg et al, which was filed May 10, 1994 under Ser. No. 08/240,798 on "Self-Clocking Glyph Shape Codes" as a continuation of Ser. No. 07/931, 554 filed Aug. 8, 1992 which is a continuation of Ser. No. 07/560,514, filed Jul. 31, 1990 (D/89194), is employed for recording this machine readable information on the hardcopy documents. Thus, the Bloomberg application hereby is incorporated by reference.

Figure 5:
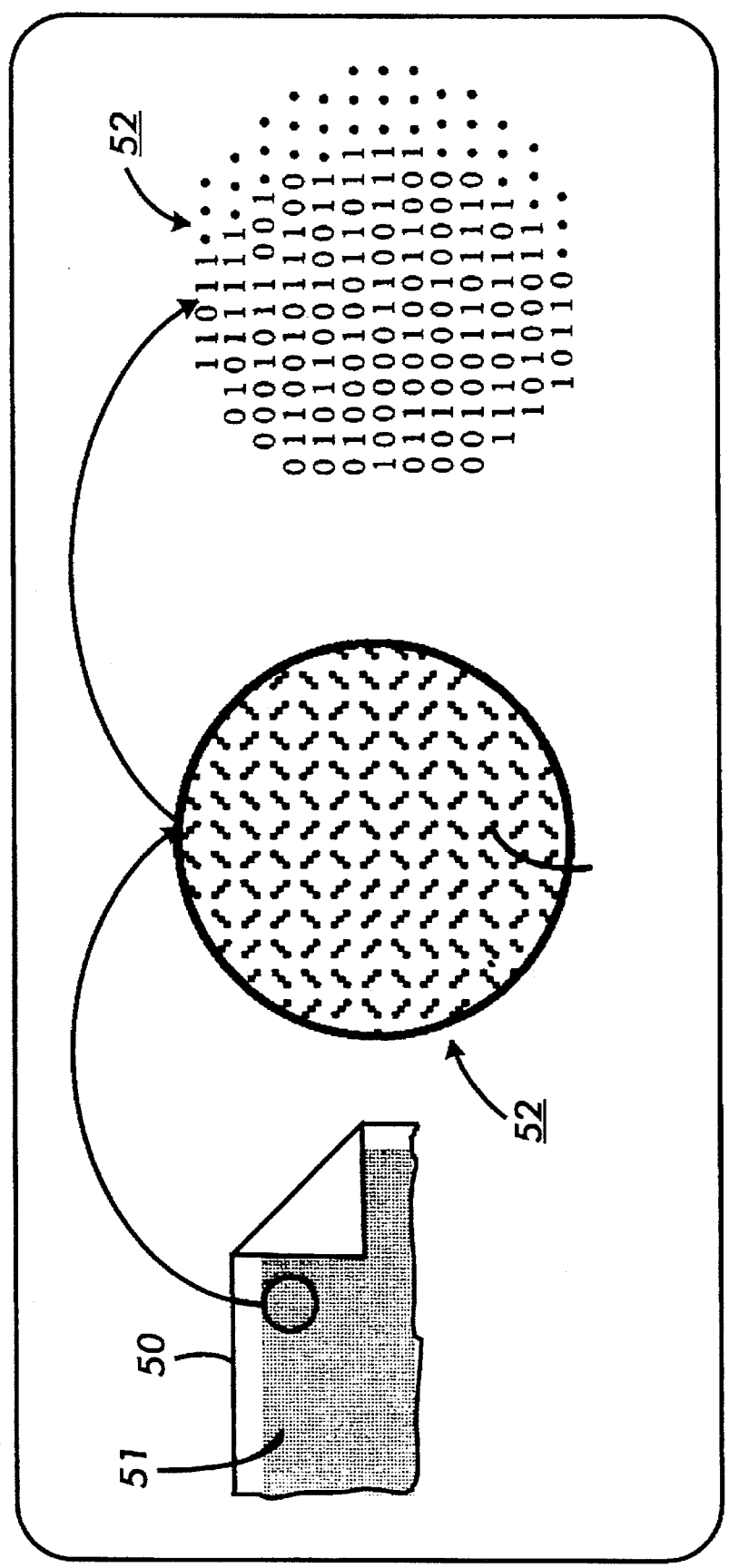
FIG. 5 illustrates a self clocking glyph code that is well suited for embedding machine readable digital color specifications in source images.

As shown in FIG. 5, a self-clocking glyph code typically comprises a easily recognizable and readily interpreted pattern 51 of marks or "glyphs" 52 which are written on the hardcopy document 50 on a spatially periodic lattice of centers. Conventionally, the angular orientation of the glyphs 52 is modulated in accordance with the digital information that is encoded by them. For example, the glyphs 52 suitably are slash-like marks of generally uniform size which are oriented at +45° and -45° with respect to a specified axis for encoding binary 1's and 0's, respectively, as at 53. One of the features of such a code is that the code pattern 51 has a generally uniform and essentially neutral textured appearance when the code is written at a sufficiently high spatial density.

A copending and commonly assigned U.S. patent application of Zydbel, Jr. et al, which was filed May 18, 1992 under Ser. No. 07/887,563 as a continuation of Ser. No. 07/530,677, filed May 30, 1990 now U.S. Pat. No. 5,486,686 on "Hardcopy Lossless Data Storage and Communications for Electronic Document Processing Systems" (D/89190), teaches that color values in a selected color space can be embedded in hardcopy documents in a suitable machine readable code to ensure that some or all of color specifications for the full color versions of those documents will survive monochromatic printing, copying and/or scanning of the documents. Further, the Zydbel, Jr. et al. application also teaches that machine readable digital encodings of the PDL (Page Description Language) descriptions of source documents may be embedded in those documents as they are being printed to prevent meaningful image information from being lost during the transformation of the source documents from the electronic domain to the hardcopy domain. Thus, it is to be noted that the process shown in FIG. 3 builds on Bloomberg et al's and Zydbel et al's teachings to implement a full color-to-highlight color copying process which can be carried out while using any version of the original image (i.e., full color, highlight color, or monochrome) as the source for the highlight color copier.

During the copying of a source image containing glyph encoded color specifications, a digital representation of the scanned-in image of the source document is processed, as at 55, to locate and decode the glyph code. Advantageously, the type of data (i.e., PDL description, color values, etc.) that is encoded by the glyph code is known in advance. If, however, the data type is an unknown, it can be encoded by the glyph code. Conceivably, the data type might be ascertainable by analysis of the decoded data, but such inferential data processing typically is susceptible to relatively high error rates.

If the glyph code provides a full color PDL description of the source image, the PDL description is used, as at 56, to select the optimal full color-to-highlight color mappings for rendering the image as a highlight color image. Unfortunately, however, the full color PDL description of most images is too large, even when compressed, to be reliably recoverable from a standard page-size hardcopy document. However, glyph codes can be employed for embedding the full color values (i.e., the color values in a suitable color space) directly in the differently colored areas of at least some hardcopy images and/or in the margins of the hardcopy (pointers would logically link these marginal glyph codes to the image regions to which they relate, but glyph codes that are embedded in images are logically linked to those images by their spatial coincidence). Preferably, these color value encodings are supplemented to include image type designators for the image regions to which they relate. These image type designators, together with the selection of a default full color-to-highlight color mapping, then can be employed, as at 57, to control the selection of the color mappings.

Provision can also be made, as at 58, for encoding a pointer to specific full color-to-highlight color mapping in a glyph code. Such a pointer is interpreted as a mandatory instruction, so the specified full color-to-highlight color mapping is selected for rendering the image region to which the pointer applies.

As will be appreciated, annotation based color mapping control (FIG. 2) can be combined with the glyph code control. On the other hand, standard image segmentation techniques may not result in reliable segmenting of images containing embedded glyph code because of the high frequency texture of such codes. A some image segmentation conceivably could be carried out based on the spatial frequency at which the color specification for the source image varies, but the effectivity of such a process is uncertain.

What is claimed:

1. A process for reproducing highlight color copies of full color source images from hardcopy versions of said source images that are of unknown color fidelity; said process comprising the steps of embedding a digital machine readable full color specification for at least a portion of a source image in a hardcopy version of said image;

scanning said hardcopy version of image to produce a digital representation thereof, including said digital full color representation;

processing said digital representation of said image to recover said full color specification;

indexing into a plurality of different full-color to highlight-color transforms in accordance with said full color specification to select at least one of said color transforms for rendering a highlight color copy of said image; and printing said highlight color copy.

2. The process of claim 1 wherein
   said digital full color specification includes an image information type characterizer for at least one portion of said source image; and said type characterization governs the selection of the color transform for the rendering of at least said portion of said image.

3. The process of claim 1 wherein different full color specifications are digitally embedded in said hardcopy version of said source image for different regions of said source image;

the digital color specifications for at least certain of said regions of said source image include respective type characterizers; and said type characterizers govern the selection of the color transforms that are used for rendering those respective regions of said image.

4. The process of claim 1 wherein the digital color specification for at least one region of said source image includes a pointer to a designated one of said full-color to highlight-color transforms; and said designated color transform is selected for rendering said region of said source document.

5. The process of claim 4 wherein different full color specifications are digitally embedded in said hardcopy version of said source image for different regions of said source image;

the digital color specifications for certain of said source image regions include characterizers which type characterize those regions of the image by image information type; and said type characterizers govern the selection of the color transforms that are used for rendering the type characterized regions of said.

6. The process of any of claims 1–5 wherein said transforms map full color images into a two color, highlight color space.

7. The process of claim 6 wherein the printing of said highlight color copy is performed by a two color, single pass highlight color print engine.

8. The process of any of claims 1–5 wherein said color specification is embedded in said hardcopy version of said image in a self-clocking glyph code;

said glyph code is composed of a machine readable pattern of elongated slash-like symbols which are written on a spatially periodic lattice of centers at a sufficient density to cause said code to have a substantially uniform visual appearance;

said symbols are written at a plurality of different angular orientations to encode different digital values.

9. The process of any of claims 1–5 wherein said transforms map full color images into a three color, highlight color space.

10. The process of claim 9 wherein the printing of said highlight color copy is performed by a two color, single pass highlight color print engine.

* * * * *